H. B. VINTEN.
DRAINAGE PIPE.
APPLICATION FILED OCT. 17, 1916.
1,259,684.
Patented Mar. 19, 1918.
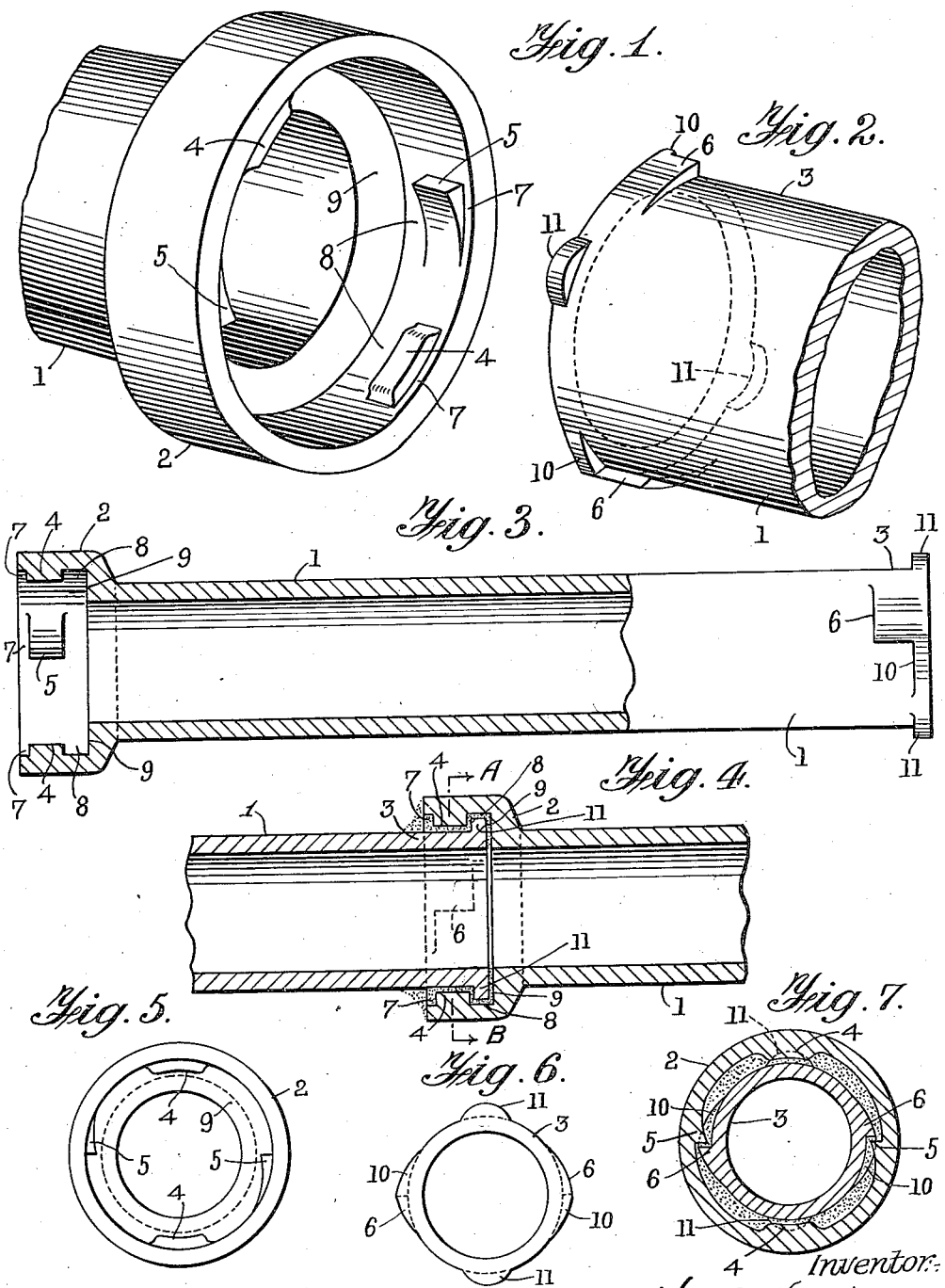
Inventor:
H. B. Vinten,
Henry P. Bright
Attorney.

UNITED STATES PATENT OFFICE.

HAROLD BERTRAM VINTEN, OF RAMSGATE, ENGLAND.

DRAINAGE-PIPE.

1,259,684.  Specification of Letters Patent.  Patented Mar. 19, 1918.

Application filed October 17, 1916.  Serial No. 126,193.

*To all whom it may concern:*

Be it known that I, HAROLD BERTRAM VINTEN, surveyor, a subject of the King of Great Britain, residing at 72 High street, Ramsgate, in the county of Kent, England, have invented a new and useful Drainage-Pipe; and I do hereby declare the following to be a full, clear, and exact description of the invention, such as will enable others skilled in the art to which it appertains to make and use the same.

This invention relates to drainage pipes which, for forming a junction of one pipe with another, are formed with one end of each pipe as a socket and the other as a spigot; and it refers particularly to pipes of this kind wherein the socket is provided interiorly with a saddle or bearing, or a number of saddles or bearings, and with internally projecting shoulders arranged longitudinally with, and upon opposite sides of, the socket and having their flat surfaces in opposed directions, the said platforms and shoulders being recessed in the mouth of the socket and serving to support the spigot end of the next pipe which is formed with two shoulders projecting outwardly from, and arranged longitudinally with, the said spigot, with their flat surfaces inverted or opposed to one another so as to engage with the shoulders in the socket when the spigot end of one pipe is placed in position in the socket end of another pipe.

My invention has for its object to provide means in a pipe joint of the above described type whereby a permanent as well as reliable junction between the pipe sections is insured.

With this object in view my invention consists in the particular construction and arrangement hereinafter described of the parts of pipe joints of the aforesaid type whereby an interlocking of one end of a pipe with that of another is effected, the pipes are maintained in alinement and all risk of the pipes sagging at the joints when settlements occur in the ground underneath the drain is eliminated.

In the accompanying drawings:—

Figure 1 is a view in perspective of the socket end of a pipe constructed in accordance with my invention.

Fig. 2 is a similar view of the spigot end of the pipe, and

Fig. 3 is a longitudinal elevational view partly in section of the complete pipe.

Fig. 4 in sectional elevation illustrates the pipe junction—the socket end of one pipe being shown as housed in the socket end of another pipe.

Fig. 5 is a front elevational view of the socket end of a pipe,

Fig. 6 is a similar view of the spigot end; and

Fig. 7 is a cross section of the joint through line A—B, Fig. 4.

In the drawings aforesaid, the drain pipe is indicated by the numeral 1, the socket is marked 2 and the spigot end 3.

4, 4, are saddles formed inside the socket 2; and 5, 5 are shoulders projecting inwardly from the wall of the said socket 2 having radially disposed abutting faces extended longitudinally of the pipes. The bearing surface of the one shoulder is inverted in its position relative to the bearing surface of the other shoulder.

6, 6 are similarly formed shoulders projecting from the outside of the spigot 3. The said saddles 4 and shoulders 5 of the socket 2 are recessed in, as at 7, from the front of the socket 2 to permit of the insertion of a fillet of cement.

To enable the parts to be locked together when the spigot end of one pipe is engaged with the socket end of the next pipe a space 8 is left between the inner ends of the saddles 4 and the shoulders 5 and the back wall 9 of the socket and the outer or front ends of the shoulders 6 on the spigot 3 are formed with projections or lugs 10 (see particularly Figs. 2, 6 and 7) which when the spigot 3 is in position in the socket 2 rest in the spaces 8 between the ends of the socket shoulders 5 and the back wall 9 of the said socket.

Other projections or lugs 11 (Figs. 2, 3, 4, 6 and 7) are formed on the end of the spigot 3 to engage in the spaces 8 between the saddles 4 and the back wall 9 of the socket 2.

Before the spigot is inserted in the socket cement is placed in the socket in the usual way and a thin layer of cement is also placed in the spaces 8 between the back wall 9 of the socket and the saddles 4, and also in the spaces between the said back wall 9 and the projecting side shoulders 5 of the socket, as well as on the flat surface of these shoulders.

The spigot 3 is then inserted in the socket 2 and, when its end reaches the back wall 9 of the socket 2 the spigot 3 is twisted around so that the lugs 10 and 11 occupy their appointed places in the socket in the spaces 8 between the back wall 9 and the shoulders 5 and the saddles 4 respectively.

The usual spaces 12 (see Fig. 7) between the spigot and the socket are then completely packed around with cement and the joint is finished by packing a cement fillet around the recess 7 at the mouth of the socket 2.

What I do claim as my invention and desire to secure by Letters Patent is:—

1. A pipe coupling comprising the combination with a pipe and having a socket, and a spigot pipe end engageable in said socket, of a pair of diametrically opposed saddle projections on the inner face of the socket and adapted for supporting relation to the spigot pipe end, lugs on the spigot pipe end for interlocking coaction with the inner side faces of the saddle projections, a pair of shoulder projections on the inner face of the socket arranged in quadrantal relation to the saddle projections and having bearing faces disposed radially and extended longitudinally of the pipe, similar shoulders on the spigot pipe and for opposing the first named shoulders and projections extending from the bearing faces of the spigot pipe end for interlocking coaction with the inner side faces of the socket shoulders.

2. A pipe coupling comprising the combination with a pipe and having a socket, and a spigot pipe and engageable in said socket, of shoulder projections on the inner face of the socket spaced from its inner end and having bearing faces disposed radially of and extending longitudinally with respect to the pipe end, similar shoulders on the spigot pipe end for opposing the first named shoulders, and projections extending from the bearing faces of the spigot end shoulders for interlocking coaction with the inner side faces of the socket shoulders upon relative rotation of the pipe ends to bring the bearing faces of the shoulders into bearing relation.

In testimony whereof I have signed my name to this specification in the presence of two subscribing witnesses.

HAROLD BERTRAM VINTEN.

Witnesses:
   GEORGE HUGHES,
   GEO. COSEHEAD.